Figure 1:
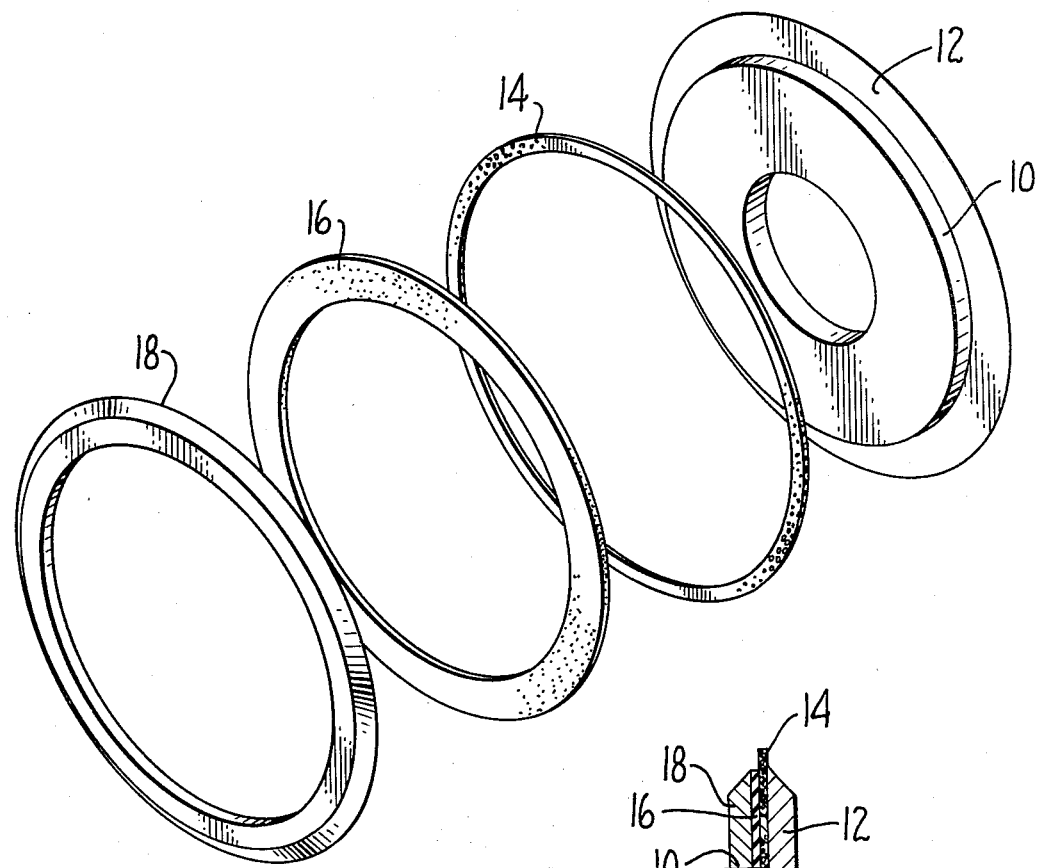

United States Patent [19]
Regan

[11] 3,886,925
[45] June 3, 1975

[54] CUTTING WHEEL
[76] Inventor: Barrie F. Regan, 1760 Manor Dr., Hillsborough, Calif. 94010
[22] Filed: Sept. 9, 1974
[21] Appl. No.: 504,449

Related U.S. Application Data
[63] Continuation-in-part of Ser. No. 371,712, June 20, 1973, abandoned.

[52] U.S. Cl. ............................... 125/15; 51/206 R
[51] Int. Cl. .............................................. B28d 1/04
[58] Field of Search ............. 51/206 R, 207; 125/15

[56] References Cited
UNITED STATES PATENTS

| | | | |
|---|---|---|---|
| 1,422,200 | 7/1922 | Harris | 51/207 |
| 2,690,632 | 10/1954 | Sevick | 51/207 |
| 3,036,412 | 5/1962 | Guilbert | 51/206 R X |
| 3,256,645 | 6/1966 | Holdash | 51/206 R |
| 3,617,363 | 11/1971 | Metzger | 117/130 |
| 3,691,707 | 9/1972 | Von Arx | 51/206 R |

*Primary Examiner*—Harold D. Whitehead

[57] ABSTRACT

An improved cutting wheel for dicing semi-conductor wafers in which a metal cutting disc with abrasive particles in a nickel matrix is held between a flange and a support ring with a body of elastomeric material compressed therebetween.

1 Claim, 2 Drawing Figures

CUTTING WHEEL

This application is a continuation-in-part of application Ser. No. 371,712 filed June 20, 1973 and now abandoned.

BACKGROUND OF THE INVENTION

Rotary cutting wheels for dicing semi-conductor wafers are well known in the art as indicated, for instance, in U.S. Pat. No. 3,691,707. Such discs may be formed by electrodeposition techniques or electroless plating, see U.S. Pat. No. 3,617,363. I have found that such discs produce cuts having chipped edges in ceramic materials because standing vibrational waves produced in the discs by the high rotational speed (10,000–20,000 R.P.M.) cutting operation cause chipping of the work piece. Additionally, I have found that this problem may be solved by sandwiching a thin layer of elastomeric adhesive material between the abrasive disc and a support ring.

While it is not intended that the invention should be limited to any particular mode of operation, I believe that the elastomeric material functions to absorb energy and dampen standing waves thereby providing a cleaner straight line cut and minimizing chipping of the work piece. In this regard, I have found that a given cutting wheel made without the support ring and elastomeric material tends to produce rough, broken edge cuts as a result of chipping while almost perfect straight line cuts can be made with the same wheel operation under identical conditions if the support ring and elastomeric material have been applied to it. A number of different elastomeric materials may be employed, but I prefer to employ the room temperature vulcanizable silicone rubbers of the type sold as "Dow/Corning Adhesive Sealing" and "General Electric Adhesive Sealing." These are the type of room temperature vulcanizable silicone rubbers sold for sealing cracks in bathroom tile and the like. Additional elastomeric materials which may be employed include polyurethane resin such as those sold by Emerson & Cuming, Inc. and modified rubbers such as those sold by the B. F. Goodrich Company under the trademark PLYABOND. The commercially available elastomeric materials are pasty fluids which contain a catalyst or curing agent which acts to cure the resin when exposed to the atmosphere.

The improved cutting wheel of this invention may be formed by preforming the hub and flange of the wheel as one piece, the abrasive cutting disc as a second piece and a support ring as a third piece followed by the step of assembling the pieces with a thin layer of elastomeric sealant between the abrasive disc and the support ring. Alternatively, and preferably, the hub and flange are preformed as a metal element and the abrasive disc composed of metal with abrasive particles embedded therein is formed on the inside surface of the flange by electrodeposition or electroless deposition. Thereafter, the elastomeric material is applied to the abrasive disc and the support ring is pressed into place and held against the flange while the elastomeric material sets. This method of prefabrication with the abrasive layer deposited on the flange is preferred because of the ease with which the abrasive layer can be mounted concentric to the flange and because this method eliminates the need for handling the abrasive disc separately.

The abrasive disc portion of the wheel may be formed by a variety of materials, for instance, electrolytically or electroless nickel deposited as in the above-identified patents with any of a variety of abrasive materials incorporated into the metal. For instance, very finely divided particles of diamond, boron carbide, silicon carbide and aluminum oxide are suitable abrasives. In the preferred construction, however, I manufacture the abrasive wheel with aluminum hubs, silicone rubber elastomeric materials and an abrasive disc formed of electrolytically deposited nickel containing particles of diamond.

Figure 2:
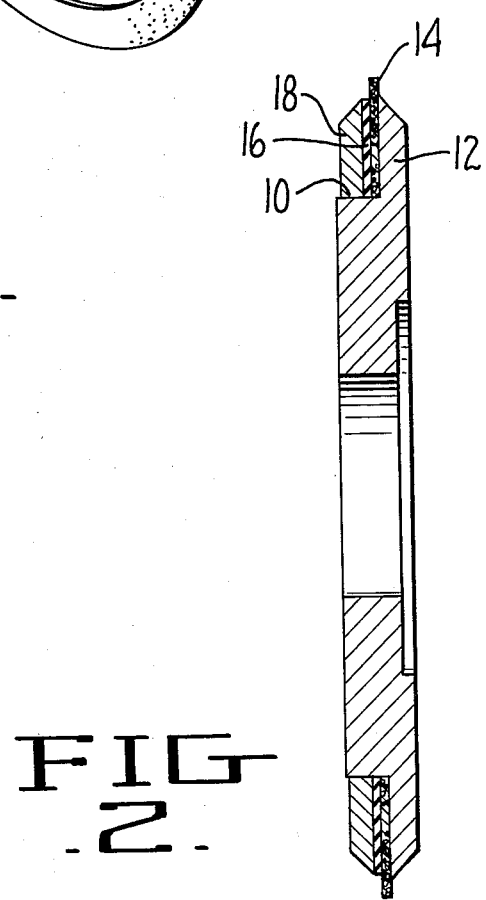

Other features and advantages of the invention will become apparent upon full consideration of the following description of the invention and attached drawings in which:

FIG. 1 is an exploded view of a cutting wheel showing the separate elements of the wheel, and FIG. 2 is a cross-sectional view through the cutting wheel of FIG. 1 assembled.

Referring now in detail to the drawing, the cutting wheel consists of a hub 10 carrying a flange 12 on which is electrolytically deposited an abrasive layer 14 formed of high purity nickel which may be deposited as indicated in technical brochure 11-644312 A-357 published by International Nickel Company, Inc., N.Y. The nickel solutions described in the brochure would have the finely divided abrasive suspended in them. it is preferred that the nickel solutions and the resulting metallic nickel deposited be of very high purity since very high purity nickel appears to be more resistant to the mechanical stresses imposed on the cutting disc at high rotational velocities. The abrasive particles are laid down with and emeshed in the electroplate.

The electroplate preferably covers the entire interior flange surface but the portion of the flange adjacent hub 10 may be masked if desired so that the abrasive plating covers the flange only in the area adjacent its periphery.

After the plating has been deposited to a thickness in the range of 0.001 to 0.20 inch, preferably about 0.002 to 0.01 inch, the outer periphery of the flange is etched away exposing the periphery of the electroplate to a depth of 0.001 to 0.200 inch, preferably 0.005 to 0.03 inch, the exposed portion constituting the cutting element of the wheel.

After the flange is electroplated, sufficient silicone resin paste to produce a thin layer on the surface of the flange is spread along the junction of flange 12 and hub 10. Sealing ring 18 which has an outside diameter smaller than the diameter of the flange and an aperture just large enough to permit it to be slid onto the shoulder part of the hub is then fitted on the hub and pressed against the flange spreading the elastomer into a thin layer 16 lying between the sealing ring and the flange. The sealing ring is pressed firmly against the flange until the resin has set. The resin adheres strongly to flange and sealing ring surfaces.

The outer abrasive cutting area of 14 is very thin and is exposed and so can be damaged by inadvertent bending during handling or fitting the wheel on the drive mechanism. In order to provide protection, the hub shoulder is of a width such that a portion of the shoulder extends through the aperture of the sealing ring. A plastic washer having an outside diameter greater than the diameter of abrasive ring 14 and having an aperture which just permits it to be forced on the hub is forced onto the hub and into contact with sealing ring 18. The wheel is shipped and handled with the plastic washer in place. The washer is removed after the wheel is fitted in the drive mechanism leaving the wheel intact and ready for use.

While one specific embodiment of the invention has been illustrated and described in detail herein, it is obvious that many modifications thereof can be made without departing from the spirit and scope of the invention.

What is claimed is:

1. An improved cutting wheel for dicing semiconductor wafers which comprises a wheel body having a hub portion and an integral peripheral flange surrounding said hub portion with said hub portion having a shoulder extending axially from said flange, a cutting disc having a thickness in the range 0.001 to 0.20 inch formed of abrasive particles embedded in an electroformed matrix of nickel electroformed onto said flange on the same side thereof as said shoulder and projecting radially from said flange, a support ring having a diameter sufficiently less than that of the cutting disc to leave the periphery of the cutting disc exposed mounted on said hub engaging said shoulder with said support ring engaging said cutting disc, and a layer of elastomeric adhesive between said ring, said flange and said cutting disc.

* * * * *